UNITED STATES PATENT OFFICE.

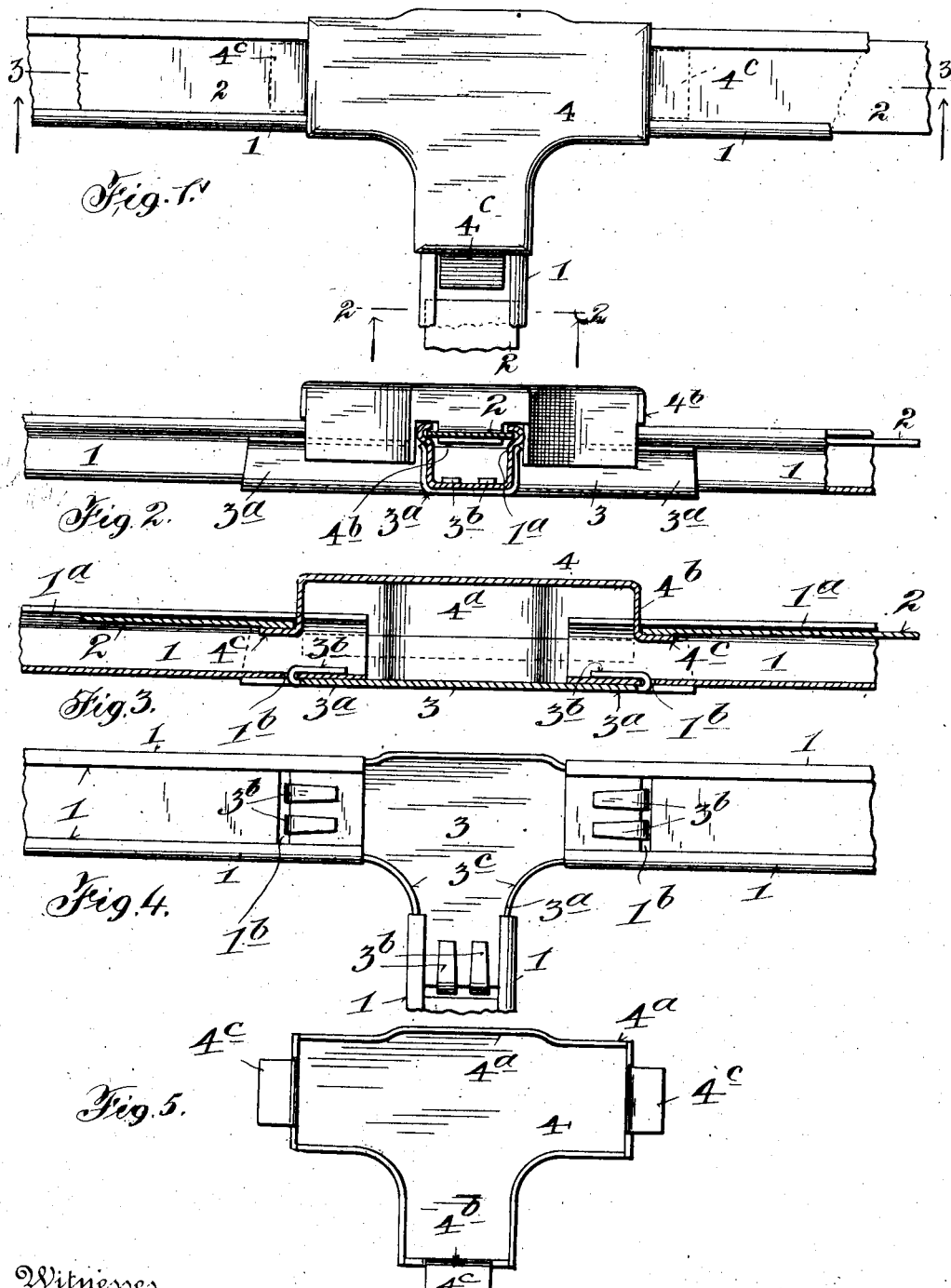

GEORGE A. LUTZ, OF NEW YORK, N. Y.

JUNCTION OR OUTLET BOX.

No. 834,828. Specification of Letters Patent. Patented Oct. 30, 1906.

Application filed September 14, 1905. Serial No. 278,426.

*To all whom it may concern:*

Be it known that I, GEORGE A. LUTZ, a citizen of the United States, residing in New York city, borough of Brooklyn, New York, have invented certain new and useful Improvements in Junction or Outlet Boxes, of which the following is a specification.

In installing conduits for electric conductors lines are frequently run in various directions from junction or outlet boxes, rosettes, receptacles, and the like, that are usually provided with caps or covers.

The object of my invention is to provide improved means for removably holding the caps or covers upon junction-boxes, receptacles, rosettes, or the like which are connected with or mounted upon conduits.

In the form of my invention set forth herein I have shown a receptacle or box connected with conduits that have one side open and are provided with removable covers, the receptacle or box having a cap or cover provided with devices that engage the covers on the conduits for holding the cap in position until the covers of the conduits have been moved back from engagement with said devices of the cap, and, as shown, the cap has lugs or portions depending in line with the ends of the covers of the conduits to limit the distance to which the covers are to be pushed into or toward the receptacle or the like.

The invention also comprises the novel details of improvement that will be more fully hereinafter set forth and then pointed out in the claims.

Reference is to be had to the accompanying drawings, forming part hereof, wherein—

Figure 1 is a plan view illustrating my improvements. Fig. 2 is a side view thereof, partly in section, on the line 2 2 in Fig. 1. Fig. 3 is a longitudinal section on the line 3 3 in Fig. 1. Fig. 4 is a plan view similar to Fig. 1 with the cap removed, and Fig. 5 is a view looking at the under side of the cap.

Similar numerals of reference indicate corresponding parts in the several views.

In the drawings, the numeral 1 indicates conduits adapted to contain electric wires, the conduits shown being of the class having one side open and provided with removable covers 2, which covers in the illustration of my invention are received in opposed grooves 1$^a$ in the side walls of the conduits 1, so the covers may slide along the conduits; but the covers may be held upon the conduits in any other suitable manner. At 3 is a junction or outlet box, receptacle, or the like, open on one side and connected with the ends of the conduits 1, whereby the wires to be contained in the conduits may run through said box or branch off therefrom.

In the drawings the box or receptacle 3 is shown provided with a plurality of branches 3$^a$, with which the ends of the conduits 1 are connected, and, as shown in Fig. 2, the ends of the conduits 1 are received in said branches between the bottom and side walls thereof, in the nature of a bond-like connection. As a means for firmly securing the conduits to the box or receptacle 3 I have shown the ends of the branches 3$^a$ provided with tongues 3$^b$, that pass through slots 1$^b$ in the conduits 1 and are bent back against the bottoms of the conduits, thereby holding the parts 1 and 3 firmly but detachably together. In order that conductors may be pulled through the box or receptacle 3 around the corners 3$^c$ without injuring the insulation on the conductors, I have shown the walls of the box at said corners as curved or rounded, said walls having their convex surfaces within the box or receptacle, (see Fig. 4,) the curved corner walls 3$^c$ thus extending between branches 3$^a$, that are at an angle to each other. The box or receptacle 3 may be made of sheet metal bent and shaped to provide the bottom and side walls thereof or may be of cast metal or formed in any suitable manner or material. At 4 is a cap or cover for the box or receptacle 3, which is shown provided with depending flanges or walls 4$^a$, that overlap the walls of the box or receptacles and the adjacent ends of the conduits at the branches 3$^a$, inclosing such ends of the conduits. The cap 4 has depending lugs or projections 4$^b$, that extend toward or into the open portions of the conduits in line with the ends of the covers 2, so that said covers may abut against such lugs or projections to limit the distance that said covers may be pushed along the conduits and into the receptacle, as clearly shown in Fig. 3. At 4$^c$ the cap 4 has projections or lips extending outwardly and under the adjacent ends of the covers 2 to prevent the cap from being lifted from the box or receptacle 3 after the covers 2 have been properly adjusted over said lips and until the covers 2 are moved back or removed from said lips.

In utilizing my improvements the conduits are connected with the box or receptacle 3, and after the conductors have been suitably located within the conduits and box the cap 4 is placed over the latter, and thus over the adjacent ends of the conduits, and the covers 2 are then adjusted against the depending projections 4ᵇ and over the lips 4ᶜ, and thus the caps will be securely held in place until the covers are removed from engagement with the lips 4ᶜ. By this means ready access may be had to the conductors within the box or receptacle by merely moving back or taking off the covers 2 and lifting off the cap 4.

While I have shown the box or receptacle 3 provided with three branches or outlets 3ᵃ, it will be understood that my invention is not limited to such number of branches or outlets for connection with conduits, for the box or receptacle may have two branches or outlets alined or at an angle to each other, as in the nature of an elbow, or may have any desired number of branches or outlets, the cap 4 being correspondingly shaped. While I have referred to the part 3 as an "outlet" or "junction" box or "receptacle" it will be understood that my invention may be used in connection with rosettes, receptacles having contacts, or other equivalent devices adapted to connect with or to be mounted upon conduits for permitting contained electric conductors to be run in various directions or to make connection with electric contacts, &c., and I use the term "receptacle" in a broad sense to comprehend any equivalent device connected with or mounted upon or located at the ends of conduits to receive or distribute the conductors, whether the cap incloses a box or is mounted over a conduit.

My invention is not limited to the particular arrangement of parts herein set forth and illustrated, as the same may be varied without departing from the spirit of my invention.

Having now described my invention, what I claim is—

1. The combination of a conduit provided with a movable cover, with a cap having a member engaging the cover to retain the cap over the conduit.

2. The combination of a conduit provided with a movable cover, with a cap having a lug extending in line with the cover, and a lip engaging the cover to hold the cap in place.

3. The combination of a conduit provided with a movable cover, with a box, and a cap having a member engaging the cover to retain the cap upon the box.

4. The combination of a conduit provided with a movable cover, with a box, means for holding the box in operative position, and a cap having a lug extending in line with the cover and a lip engaging the cover to retain the cap in place.

5. The combination of a box and a plurality of conduits having movable covers, said box having a cap provided with means to engage said covers to retain the cap upon the box.

6. The combination of a box and a plurality of conduits having movable covers, means for holding the box in operative position, said box having a cap provided with lugs to engage the covers to limit the inward movement of the latter toward the box, and means to engage the covers to hold the cap on the box.

7. The combination of a box and a plurality of conduits having movable covers, means for holding the box in operative position, said box having a cap provided with lugs extending in the path of said covers to limit the inward movement of the covers toward the box, and lips extending under the covers to hold the cap on the box.

8. The combination of a box having outlets, and means for holding the box in operative position, with conduits provided with removable covers and having their ends located in line with the outlets of the box, said box having a cap provided with inwardly-extending lugs and outwardly-extending lips to engage the covers to limit the movement of the covers toward the box and to hold the cap upon the box.

9. A device of the character described comprising a box having a plurality of outlets and a cap having a plurality of lugs extending toward said outlets and also having lips extending outwardly, and means for holding the box in operative position, for the purposes set forth.

10. A device of the character described comprising a box provided with a plurality of outlets and a cap having a plurality of lugs extending toward the box, said lugs being provided with outwardly-extending lips, and means for holding the box in operative position, for the purposes set forth.

11. The combination of a box provided with a plurality of branches, conduits with said branches, means for attaching the conduits to the branches, removable covers for the conduits, and a cap for the box having portions extending over the branches and provided with lugs extending in line with the covers of the conduits for retaining the cap upon the box.

12. The combination of a box provided with a plurality of branches, conduits alined with said branches, means for holding the box in operative position, means for attaching the conduits to the branches, removable covers for the conduits, and a cap for the box having portions extending over the branches and provided with lugs extending in line with the covers of the conduits, and lips to engage the covers to hold the latter on the receptacle.

13. An outlet or junction box having a plurality of branches extending outwardly, said branches having prongs, combined with conduits having covers, said prongs engaging said conduits, and a cap provided with means to engage said covers to retain the cap upon the box.

GEORGE A. LUTZ.

Witnesses:
 T. F. BOURNE,
 M. HOLLINGSHEAD.